J. LYONS.
PARCEL POST CALCULATOR.
APPLICATION FILED FEB. 14, 1913.
1,169,413.
Patented Jan. 25, 1916.
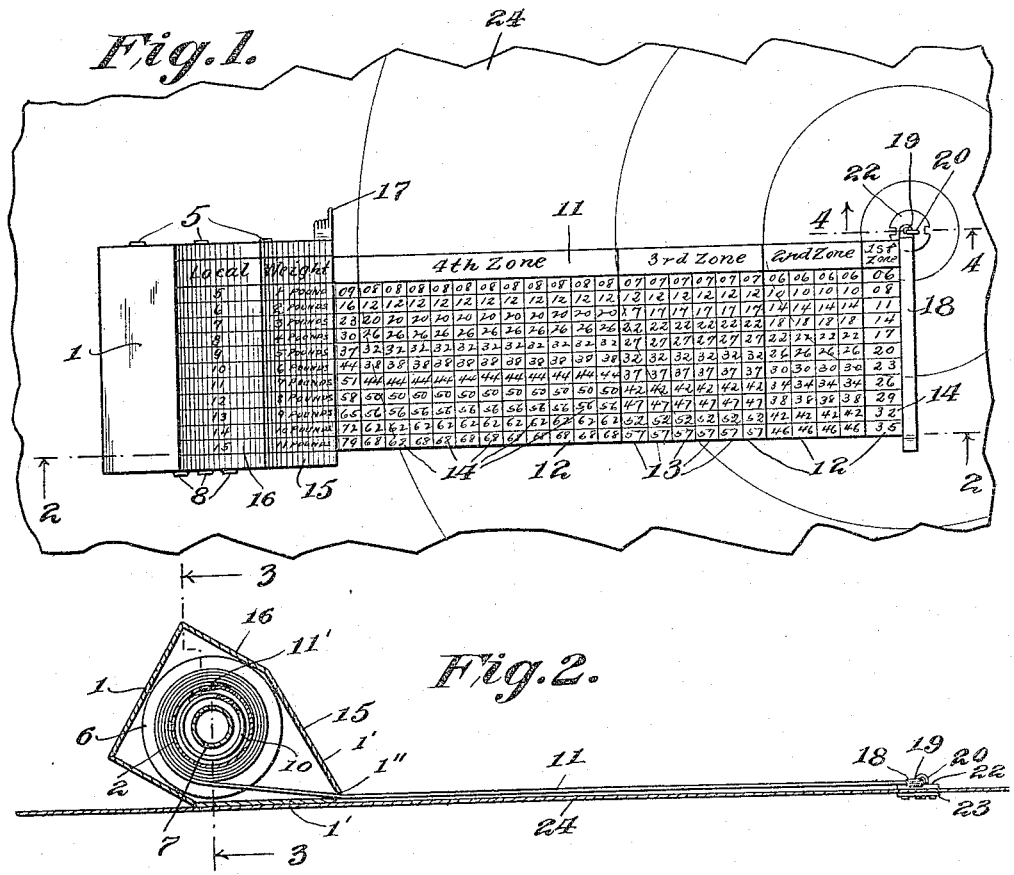
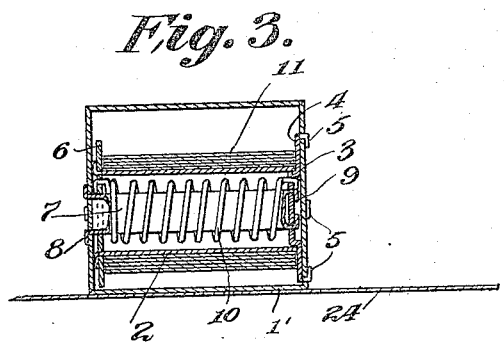
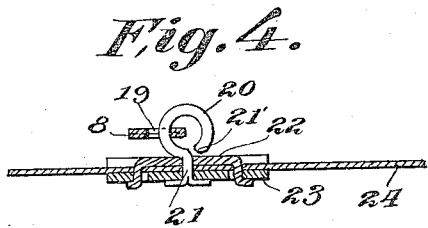
Witnesses
Horace H. Lybrand
C. H. Fesler
Inventor
James Lyons
By Edgar M. Kitchin
his Attorney

UNITED STATES PATENT OFFICE.

JAMES LYONS, OF NEW YORK, N. Y.

PARCEL-POST CALCULATOR.

1,169,413.  Specification of Letters Patent.  Patented Jan. 25, 1916.

Application filed February 14, 1913. Serial No. 748,502.

*To all whom it may concern:*

Be it known that I, JAMES LYONS, a citizen of the United States, residing at New York, in the county of New York and State of New York, have invented certain new and useful Improvements in Parcel-Post Calculators; and I do hereby declare the following to be a full, clear, and exact description of the invention, such as will enable others skilled in the art to which it appertains to make and use the same.

This invention relates to improvements in calculating apparatus, and particularly to such as is adapted to indicate the cost of a shipment by parcel post.

The object in view is the production of a simple and efficient construction adapted for enabling the user to make a quick and accurate calculation entirely by mechanical operations.

With this and further objects in view, as will in part become apparent and in part be hereinafter stated, the invention comprises certain novel constructions, combinations and arrangements of parts as herein specified and claimed.

In the accompanying drawing,—Figure 1 is a top plan view of an apparatus embodying the features of the present invention, a fragment only of the map being indicated. Fig. 2 is a longitudinal, vertical section taken on the plane indicated by line 2—2 of Fig. 1. Fig. 3 is a transverse, vertical section taken on the planes indicated by line 3—3 of Fig. 2. Fig. 4 is an enlarged, detail, fragmentary, vertical section of the swivel for the tape.

Referring to the drawing by numerals, 1 indicates a casing or housing which may be of various constructions, but is especially characterized by having two converging or inclined walls 1' approaching each other and leaving a longitudinal slot 1" therebetween.

Arranged within the housing 1 is a spool which preferably consists of the hollow cylinder 2 journaled on a bearing 3 which extends inwardly from a plate 4, the latter being arranged inside the housing 1 and clamped to one end thereof by clenching fingers or tabs 5. The opposite end of the cylinder 2 is clenched to a disk 6 which forms the flange at one end of the spool, the plate 4 serving as the flange for the other end thereof. The disk 6, however, extends inwardly radially from the cylinder 2 and is apertured centrally for snugly accommodating a core or tubular rod 7, which latter has one end clenched, as at 8, to the respective end of the housing 1, and the other end clenched, as at 9, to the central portion of the plate 4.

A helical spring 10 is coiled about the core 7 and has one end fixed to the plate 4, and the other end fixed to the disk 6.

A tape 11 is wrapped about the cylinder 2 in a direction adapted to cause the cylinder to revolve and wind up spring 10 when the tape is drawn out from the spool, the inner end of the tape being fixed as at 11' to the cylinder 2. The outer portion of the tape extends through the slot 1" for purposes hereinafter specified, and each face of the tape is printed with suitable indicia, consisting preferably of general columns, indicated at 12, 12, and representing the several zones as established by the Post Office Department, each column 12 being of a width equal to the mileage prescribed by the postal regulations for the particular zone, the measurement of such width being on a scale proportioned to the scale of a map with which the tape is adapted to be used.

For facility of reading the cost indications, each general column 12 is divided up, where the space is great enough to permit such division, into a series of detail or specific columns 13, and the tape is ruled longitudinally for dividing each column 13 into eleven squares or blocks corresponding to the number of pounds permitted to be transmitted under the postal regulations. Each of the said squares or blocks is provided with a number, indicated at 14, corresponding to the number of cents charged for the respective number of pounds and the distance, according to the zone in which the particular block appears. The sides of housing 1 which are continuous of plates 1' together with said plates are ruled with lines corresponding to and continuous of the longitudinal lines of the tape 11. Each of said sides of housing 1 is provided with a column of numbers 16, one number to each space formed by the longitudinal lines, these numbers indicating the lowest or local rate, and the corresponding plates 1' are formed each with a column of indicia 15 indicating pounds of possible shipment, and ranging consecutively from 1 at the head of the column to 11 at the foot of the column, each pound mark appearing in its respective space or block provided by the longitudinal lines. Preferably above the column 16 appears the word "Local," and preferably above the column 15 appears the word "Weight." Also above each of the columns 12, preferably appears indicia such as "First zone," "Second zone," etc., indicating the respective zones, but it is, of course, obvious that other indicating marks may be employed as desired.

Extending laterally or endwise from the end edge of the plate 1' which bears the column 15 is a pointer 17, which preferably assumes the form of an index finger, and coöperating with said index finger is the eye 19 of a binding strip or bar 18 fixed to the free end of the tape 11.

It will be observed that the tape 11 is adapted for use on any map proportionally scaled and may be used merely by placing the end of the bar 18 with the eye 19 over the starting point or place of shipment and moving the housing 1 across the face of the map until the pointer 17 arrives at the destination point. If the particular package weighs one pound, the cost of shipment will be shown by the particular number 14 appearing at the head of the last exposed column 13, and if the weight of the package is eleven pounds the cost will be indicated by the number appearing at the base of the same column. The intermediate weights will be correspondingly indicated according to the relative location of the weight indication with respect to the intermediate blocks of the respective column 13.

Thus the apparatus is adapted for general application and use with any properly scaled map, but I preferably employ the same with an attachment device connecting the parts to a map at the point of shipment. A detail form of construction of such connection is clearly illustrated in Fig. 4, and consists of an eye 20 to which the eye 19 is attached, and the eye 20 is provided with a shank 21, extending through clamping plates 22 and 23 which are arranged on the opposite faces of and clamped to the map 24. The shank 21 may be bifurcated or otherwise formed to facilitate clasping or riveting the parts together, and the plate 22 is preferably provided with clenching tabs or projections as clearly seen in Fig. 4 extending through the map and through apertures in plate 23 and clenched against said plate 23.

The operation of the calculator with the pivotal connection with the map is identical with that above described, and the connection with the map greatly facilitates the operation as it obviates the necessity for locating the starting point each time. The pivotal connection is universal, and as the tape is printed alike on both sides, with corresponding indications on the opposite side of housing 1 and plate 1' from that shown, the tape may be swung about the map or inverted at pleasure and still display the desired indications.

The eye 20 is formed with an opening 21' for enabling detachment of bar 18 therefrom when desired, so as to enable independent use of the tape or of the map. It is of course apparent that the universal pivotal connection of the tape to the map may assume any of numerous embodiments, all within the spirit and scope of this invention.

What I claim is:—

1. In a device of the class described, the combination of a tape divided into zones and provided with coöperative indicia proportioned to the zones, a housing for the tape bearing coöperating indicia for completing a calculation upon the displaying of the required zone, and a map engaged by the outer end of the tape, the map bearing coöperating indicia representing zones across which the housing is adapted to be moved for the displaying of the tape on the map.

2. In a device of the class described, the combination of a tape bearing indicia, a housing therefor bearing coöperating indicia, and a map also bearing coöperating indicia, said tape being connected to the housing and to the map and movable relative to each.

3. In a device of the class described, the combination of a tape bearing indicia, a housing therefor bearing coöperating indicia, and a map also bearing coöperating indicia, said tape being connected at one end portion within the housing, and at the other end portion to the map.

In testimony whereof I affix my signature in presence of two witnesses.

JAMES LYONS.

Witnesses:
 MARY DURNLL,
 PALLAS HERRMAN.